(12) United States Patent
Mas

(10) Patent No.: US 10,971,968 B2
(45) Date of Patent: Apr. 6, 2021

(54) NOISELESS SELF-VENTILATED MOTOR, IN PARTICULAR FOR A RAILWAY VEHICLE

(71) Applicant: ALSTOM Transport Technologies, Saint-Ouen (FR)

(72) Inventor: Thomas Mas, Pantin (FR)

(73) Assignee: ALSTOM Transport Technologies, Saint-Quen (FR)

( * ) Notice: Subject to any disclaimer, the term of this patent is extended or adjusted under 35 U.S.C. 154(b) by 114 days.

(21) Appl. No.: 15/888,793

(22) Filed: Feb. 5, 2018

(65) Prior Publication Data

US 2018/0226858 A1    Aug. 9, 2018

(30) Foreign Application Priority Data

Feb. 3, 2017  (FR) ...................................... 1750918

(51) Int. Cl.
*H02K 5/24* (2006.01)
*F04D 29/66* (2006.01)
(Continued)

(52) U.S. Cl.
CPC ............. *H02K 5/24* (2013.01); *F04D 17/165* (2013.01); *F04D 19/002* (2013.01);
(Continued)

(58) Field of Classification Search
CPC ... H02K 5/24; H02K 9/04; H02K 9/06; F04D 29/663; F04D 29/665; F04D 2300/514;
(Continued)

(56) References Cited

U.S. PATENT DOCUMENTS

| 771,468   | A | * | 10/1904 | Falk ......................... | H02K 9/18 310/57 |
| 1,797,455 | A | * | 3/1931  | Vose ......................... | A47L 5/24 417/423.2 |

(Continued)

FOREIGN PATENT DOCUMENTS

| CA | 002851745 A1 * | 5/2013 | ........... F04D 29/547 |
| CN | 104143883 A    | 11/2014 | |

(Continued)

OTHER PUBLICATIONS

EPO English machine translation, Sardou, FR2728029A1. (Year: 1996).*

(Continued)

*Primary Examiner* — Burton S Mullins
(74) *Attorney, Agent, or Firm* — Thompson Coburn LLP; Steven M. Ritchey

(57) ABSTRACT

The self-ventilated motor (10) comprises a casing (12) having an air inlet opening (18) and an air outlet opening (20) and delimiting an air passage between the air inlet opening (18) and the air outlet opening (20), drive means (13) comprising a shaft (22) housed in the casing (12), a ventilation propeller (24) connected to the shaft (22) upon rotation and housed in the air passage, and a noise reduction device (26). The noise reduction device (26) comprises a first noise reduction member (28), attached to the casing (12) at the air inlet opening (18), a second noise reduction member (30) arranged on the ventilation propeller (24), and a third noise reduction member (32) fixed to the casing (12) at the air outlet opening (20).

3 Claims, 1 Drawing Sheet

(51) Int. Cl.
  *F04D 25/08* (2006.01)
  *H02K 9/06* (2006.01)
  *H02K 5/04* (2006.01)
  *F04D 17/16* (2006.01)
  *F04D 19/00* (2006.01)
  *H02K 5/20* (2006.01)
  *H02K 7/14* (2006.01)
  *B61C 3/00* (2006.01)

(52) U.S. Cl.
  CPC ......... *F04D 25/082* (2013.01); *F04D 29/663* (2013.01); *H02K 5/20* (2013.01); *H02K 7/14* (2013.01); *H02K 9/06* (2013.01); *B61C 3/00* (2013.01); *H02K 5/04* (2013.01)

(58) Field of Classification Search
  CPC .. F04D 2300/603; F04D 29/664; F04D 29/66; F04D 17/165; F04D 19/002; F04D 25/082; F04D 29/4226; F04D 29/4253; F04D 29/4213
  USPC ........... 310/51; 181/202, 256, 284; 416/180, 416/223 R, 241 A, 500; 417/312, 423.14, 417/902; 415/119, 218.1, 219.1
  See application file for complete search history.

(56) References Cited

U.S. PATENT DOCUMENTS

| | | | | |
|---|---|---|---|---|
| 2,615,937 A * | 10/1952 | Ludwig | | H02K 9/06 |
| | | | | 310/63 |
| 2,881,337 A * | 4/1959 | Wall | | F16L 55/0279 |
| | | | | 310/57 |
| 3,102,679 A * | 9/1963 | Emil | | F04D 17/165 |
| | | | | 417/84 |
| 3,312,386 A * | 4/1967 | Hull | | F04D 17/165 |
| | | | | 415/218.1 |
| 3,584,968 A * | 6/1971 | Keith | | F04D 17/165 |
| | | | | 415/210.1 |
| 3,980,912 A | 9/1976 | Panza | | |
| 4,132,912 A * | 1/1979 | Wright | | H02K 9/14 |
| | | | | 310/62 |
| 4,475,867 A * | 10/1984 | Smith | | F04D 29/665 |
| | | | | 415/119 |
| 4,508,486 A * | 4/1985 | Tinker | | F04D 29/664 |
| | | | | 415/119 |
| 4,692,091 A * | 9/1987 | Ritenour | | F04D 29/526 |
| | | | | 415/119 |
| 4,742,257 A * | 5/1988 | Carpenter | | H02K 9/14 |
| | | | | 310/57 |
| 4,780,052 A * | 10/1988 | Pradelle | | F04D 29/545 |
| | | | | 415/119 |
| 5,026,476 A * | 6/1991 | Ishimoto | | H02K 5/24 |
| | | | | 181/202 |
| 5,257,902 A * | 11/1993 | Atarashi | | F04D 29/666 |
| | | | | 415/119 |
| 5,743,710 A * | 4/1998 | Yapp | | F04D 17/165 |
| | | | | 415/208.2 |
| 6,454,527 B2 * | 9/2002 | Nishiyama | | F01P 11/12 |
| | | | | 264/51 |
| 6,570,276 B1 * | 5/2003 | Morel | | F04D 25/082 |
| | | | | 310/52 |
| 6,891,290 B2 * | 5/2005 | Nagayama | | H02K 1/32 |
| | | | | 310/58 |
| 7,495,362 B2 * | 2/2009 | Tung | | F04D 29/329 |
| | | | | 310/156.26 |
| 7,629,717 B2 * | 12/2009 | Kanei | | H02K 9/08 |
| | | | | 310/64 |
| 2010/0170745 A1 * | 7/2010 | Pfeifer | | B60R 13/0838 |
| | | | | 181/284 |
| 2014/0062232 A1 * | 3/2014 | Cocks | | H02K 9/14 |
| | | | | 310/59 |
| 2015/0351599 A1 * | 12/2015 | Park | | A47L 9/22 |
| | | | | 417/423.2 |

FOREIGN PATENT DOCUMENTS

| | | | | |
|---|---|---|---|---|
| CN | 204481621 U | | 7/2015 | |
| DE | 001808122 | * | 5/1970 | ......... F04D 17/165 |
| DE | 001703445 | * | 12/1971 | ......... F04D 17/165 |
| EP | 0625456 A1 | | 11/1994 | |
| FR | 2393960 | * | 1/1979 | ......... F04D 29/665 |
| FR | 2728028 | * | 6/1996 | ......... F04D 19/002 |
| GB | 000733544 | * | 7/1955 | ......... F04D 29/042 |
| GB | 000849744 | * | 9/1960 | ......... F04D 17/165 |
| JP | 354010412 A | * | 1/1979 | ............ F04D 29/66 |
| JP | S57-16547 A | | 1/1982 | |
| JP | S62-221837 A | | 9/1987 | |
| JP | S63-206137 A | | 8/1988 | |
| JP | H0179359 U | | 5/1989 | |
| WO | 2011027519 | * | 3/2011 | ......... F04D 29/542 |

OTHER PUBLICATIONS

EPO English machine translation, Andre, FR2393960A1. (Year: 1979).*

Search Report for FR Application 1750918 dated Jun. 21, 2017.

* cited by examiner

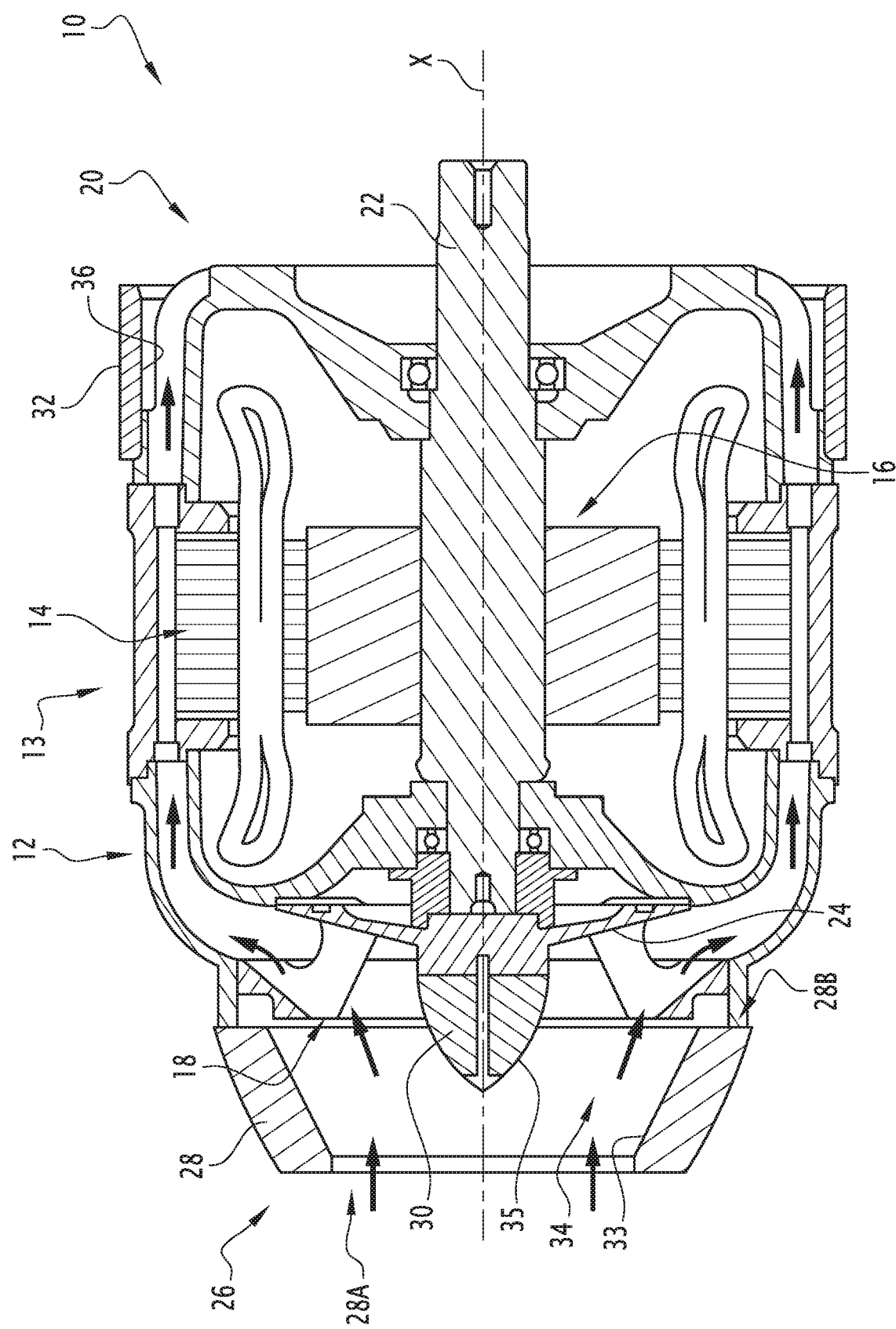

NOISELESS SELF-VENTILATED MOTOR, IN PARTICULAR FOR A RAILWAY VEHICLE

CROSS-REFERENCE TO RELATED APPLICATION

This application claims the benefit of French Application No. 1750918, filed on Feb. 3, 2017, which is incorporated herein by reference in its entirety.

FIELD OF INVENTION

The present invention relates to a self-ventilated motor, in particular for a railway vehicle.

BACKGROUND OF INVENTION

A self-ventilated motor conventionally comprises a rotor and a stator, wherein the rotor is provided with an output shaft. The self-ventilated motor further comprises a ventilation propeller, mounted on the output shaft.

As the propeller is connected to the output shaft upon rotation, it is automatically activated when the output shaft rotates, resulting in the circulation of an air flow inside the motor to cool the motor.

Such a self-ventilated motor, however, has the disadvantage of being particularly noisy. In fact, the air flow generated by the ventilation propeller is a source of significant noise.

More particularly, the noise is generated by the air flow induced by the propeller, and its propagation on the front and side surfaces of the motor, as well as towards the rear of the motor.

SUMMARY OF THE INVENTION

The object of the invention is, in particular, to remedy this drawback by proposing a relatively quiet self-ventilated motor.

For this purpose, the invention particularly relates to a self-ventilated motor, in particular for a railway vehicle, comprising:
- a casing having an air inlet opening and an air outlet opening, and delimiting an air passage between the inlet and outlet air openings,
- drive means comprising a shaft, housed in the casing,
- a ventilation propeller housed in the air passage and connected with the shaft upon rotation, and
- a noise reduction device, characterized in that the noise reduction device comprises:
- a first noise reduction member fixed to the casing at the air inlet opening,
- a second noise reduction member arranged on the ventilation propeller, and
- a third noise reduction member fixed to the casing at the air outlet opening.

The three noise reduction members act in synergy to optimally absorb the sound waves due to the air flow in the motor.

A self-ventilated motor according to the invention may further comprise one or more of the following characteristics, taken alone or in any technically feasible combination.
- the first noise reduction member has a generally curved shape, and comprises a first base having a first opening, and a second base having a second opening, wherein the second opening is arranged opposite the air inlet opening of the casing.
- the first opening of the first noise reduction member extends over a surface substantially equal to that over which the air inlet opening extends.
- the first noise reduction member delimits a cavity in which the second noise reduction member is at least partly housed.
- the first noise reduction member has an inner wall delimiting the cavity, wherein the inner wall comprises an inner lining of noise absorbing material, for example made of polyester fibers or melamine foam.
- the inner absorbing lining is covered with a porous layer, for example in the form of a micro-perforated metal sheet.
- the second noise reduction member has a generally curved shape.
- the second noise reduction member has an outer face comprising a noise absorbing lining, for example made of polyester fibers or melamine foam, optionally covered by a porous layer, for example in the form of a micro-perforated metal sheet.
- the third noise reduction member has a generally cylindrical shape that is coaxial with the shaft and surrounds the casing at the air outlet opening.
- the third noise reduction member has an inner surface comprising an noise absorbing lining, for example made of polyester fibers or melamine foam, preferably covered by a porous layer, for example in the form of a micro-perforated metal sheet.

BRIEF DESCRIPTION OF THE DRAWING

FIG. 1 shows a self-ventilated motor according to an exemplary embodiment of the invention.

DETAILED DESCRIPTION OF THE INVENTION

The invention will be better understood by reading the description which follows, given solely by way of example and with reference to the single appended FIGURE, wherein it shows an axial sectional view of a self-ventilated motor according to an exemplary embodiment of the invention.

Referring to FIG. 1, the motor 10 is intended, in particular, to equip a railway vehicle.

The motor 10 comprises a casing 12 housing drive means 13.

The drive means 13 comprise a stator 14 fixed to the casing 12, and a rotor 16 that is rotatable about an axis of rotation X.

The casing 12 has an air inlet opening 18 and an air outlet opening 20 that are aligned in the direction of the axis of rotation X. Thus, the casing 12 defines an air passage between the air inlet opening 18 and the air outlet opening 20, wherein the rotor 16 and the stator 14 are at least partly housed in this air passage.

The drive means 13 also comprise an output shaft 22, extending along the axis of rotation X, and movable about this axis of rotation X upon rotation. The output shaft 22 is connected to the rotor 16 upon rotation.

The motor 10 is self-ventilated. For this purpose, it comprises a ventilation propeller 24 that is connected to the output shaft 22 upon rotation. More precisely, the ventilation propeller 24 is mounted on one end of the output shaft 22 close to the air inlet opening 18. Thus, when the output shaft 22 is rotated during normal operation of the motor, the ventilation propeller 24 also rotates. Air is then drawn through the air inlet opening 18 and discharged through the air outlet opening 20 under the effect of the rotation of the ventilation propeller 24. The air passing through the air passage then cools the rotor 16 and the stator 14.

The motor 10 comprises a noise reduction device 26 in order to limit the noise due to the ventilation propeller 24 that results mainly from the air flow generated by this ventilation propeller 24.

The noise reduction device 26 comprises a first noise reduction member 28, a second noise reduction member 30 and a third noise reduction member 32, acting in synergy to minimize the noise due to the circulation of the air flow in the motor 10.

The first noise reduction member 28 is arranged at the air inlet opening 18 and forms a skirt surrounding this air inlet opening 18.

The first noise reduction member 28 has a general shape of revolution about the axis of rotation X.

The first noise reduction member 28 has a generally curved shape and extends in the direction of the axis of rotation X between a first base 28A having a first opening, and a second base 28B having a second opening, wherein the second opening is arranged to face the air inlet opening 18 of the casing 12.

Advantageously, the first base 28A extends over a surface that is smaller than the second base 28B. Thus, the first noise reduction member 28 has a curved wall with a substantially frustoconical shape.

Similarly, the first opening extends over a surface that is smaller than the second opening. However, the first opening extends substantially over a surface similar to that of the air inlet opening 18, so that the presence of the first noise reduction member 28 does not modify, or only slightly modifies, the cross-section of the air inlet opening. Accordingly, the second opening is larger than the air inlet opening 18 as may be seen in the FIGURE.

The first noise reduction member 28 is hollow, and has an inner wall 33 delimiting a cavity 34.

The inner wall 33 comprises a lining of noise absorbing material, i.e. that is capable of absorbing sound waves.

For example, the lining may be made of polyester fiber or melamine foam. Any other noise absorbing material is, however, possible.

Advantageously, the lining is covered with a porous layer, for example in the form of a micro-perforated metal sheet.

This porous layer maximizes the friction surface between the air flow and the absorbing lining, thereby improving noise reduction.

The second noise reduction member 30 is at least partly housed in the cavity 34. Thus, the second noise reduction member 30 is arranged to face the inner wall 33.

The first noise reduction member 28 thus delimits an air inlet channel with the second noise reduction member 30. The air enters the motor through this air inlet channel.

The dimensions of this air inlet channel may be adjusted by modifying the dimensions of the second noise reduction member 30 (diameter, length along X axis . . . ), or of the first noise reduction member 28 (length along X axis, convergence angle . . . ). These dimensions are chosen to obtain the best compromise between the desired noise reduction and the desired space requirement for the motor 10.

The second noise reduction member 30 has a generally curved shape of revolution about the axis of rotation X.

The second noise reduction member 30 has an outer surface 35 preferably comprising a noise absorbing lining, optionally covered by a porous layer. Such a porous layer maximizes the friction surface between the air flow and the absorbing lining.

As before, the absorbing lining is, for example, made of polyester fibers or melamine foam, or any other possible noise absorbing material. The porous layer is for example formed by a micro-perforated metal sheet.

The third noise reduction member 32 is attached to the casing 12 and is arranged at the air outlet opening 20 to form a skirt surrounding this air outlet opening 20.

The third noise reduction member 32 advantageously has a general shape of revolution about the axis of rotation X. More particularly, the third noise reduction member 32 advantageously has a generally cylindrical shape about the axis of rotation X. Such a cylindrical shape makes it possible to reduce noise but without any significant effect on the outgoing air flow.

The third noise reduction member 32 delimits an air outlet channel with the casing 12 around the air outlet opening 20.

The third noise reduction member 32 also has an inner surface 36, preferably comprising a noise absorbing coating, that is advantageously covered with a porous layer.

The absorbing lining is, for example, made of polyester fibers or melamine foam, or other possible noise absorbing material, while the porous layer is, e.g. in the form of a micro-perforated metal sheet.

As before, the porous layer makes it possible to maximize the friction surface between the air flow and the absorbing lining.

The functioning of the noise reduction device 26 will now be described.

The air flow is drawn into the motor by the ventilation propeller 24 through the air inlet channel delimited by the first noise reduction member 28 and the second noise reduction member 30.

The acoustic energy generated by the air flow and the movement of the ventilation propeller 24, propagates towards this air inlet channel, and is absorbed by the noise absorbing material covering the inner wall 33 of the first noise reduction member 28 and the outer face 35 of the second noise reduction member 30.

The acoustic energy propagated through the motor to the air outlet 20 is also directed to the air outlet channel, and is absorbed by the absorbing material covering the inner surface 36 of the third noise reduction member 32.

It should be noted that the invention is not limited to the embodiment described above, but could have various complementary variants.

The invention claimed is:

1. A self-ventilated motor, comprising:
   a casing having an air inlet opening and an air outlet opening, and delimiting an air passage between the air inlet opening and the air outlet opening;
   a drive device comprising a shaft housed in the casing, the shaft rotating around an axis of rotation;
   a ventilation propeller housed in the air passage and connected to an end of the shaft; and
   a noise reduction device for reducing noise, wherein the noise reduction device comprises:
      a first noise reduction member fixed to the casing at the air inlet opening, the first noise reduction member comprising a first noise absorbing material and having an inner wall delimiting a cavity, wherein the first noise reduction member has a curved shape comprising a frustoconical shape with a dome-shaped wall, and extends in a direction of the axis of rotation between a first base having a first opening and a second base having a second opening, wherein the second opening is arranged to face the air inlet opening of the casing, and wherein the first opening of the first noise reduction member extends over a surface smaller than the second opening, the surface of the first opening being equal to that over which the air inlet opening extends, and wherein the inner wall of the first noise reduction member has a frustoconical shape from the first opening to the second opening;

a second noise reduction member arranged on an end of the ventilation propeller, the second noise reduction member comprising a second noise absorbing material and having an outer face, wherein the second noise reduction member is at least partly housed in the cavity delimited by the first noise reduction member, so that the first noise reduction member delimits an air inlet channel with the second noise reduction member; and a third noise reduction member fixed to the casing at the air outlet opening, the third noise reduction member comprising a third noise absorbing material.

2. The self-ventilated motor according to claim 1, wherein the second noise reduction member has a curved shape.

3. The self-ventilated motor according to claim 1, wherein the third noise reduction member has a cylindrical shape that is coaxial with the shaft and surrounds the casing at the air outlet opening.

* * * * *